(No Model.) 3 Sheets—Sheet 1.
A. L. GILSTROP.
LOCOMOTIVE.
No. 360,875. Patented Apr. 12, 1887.
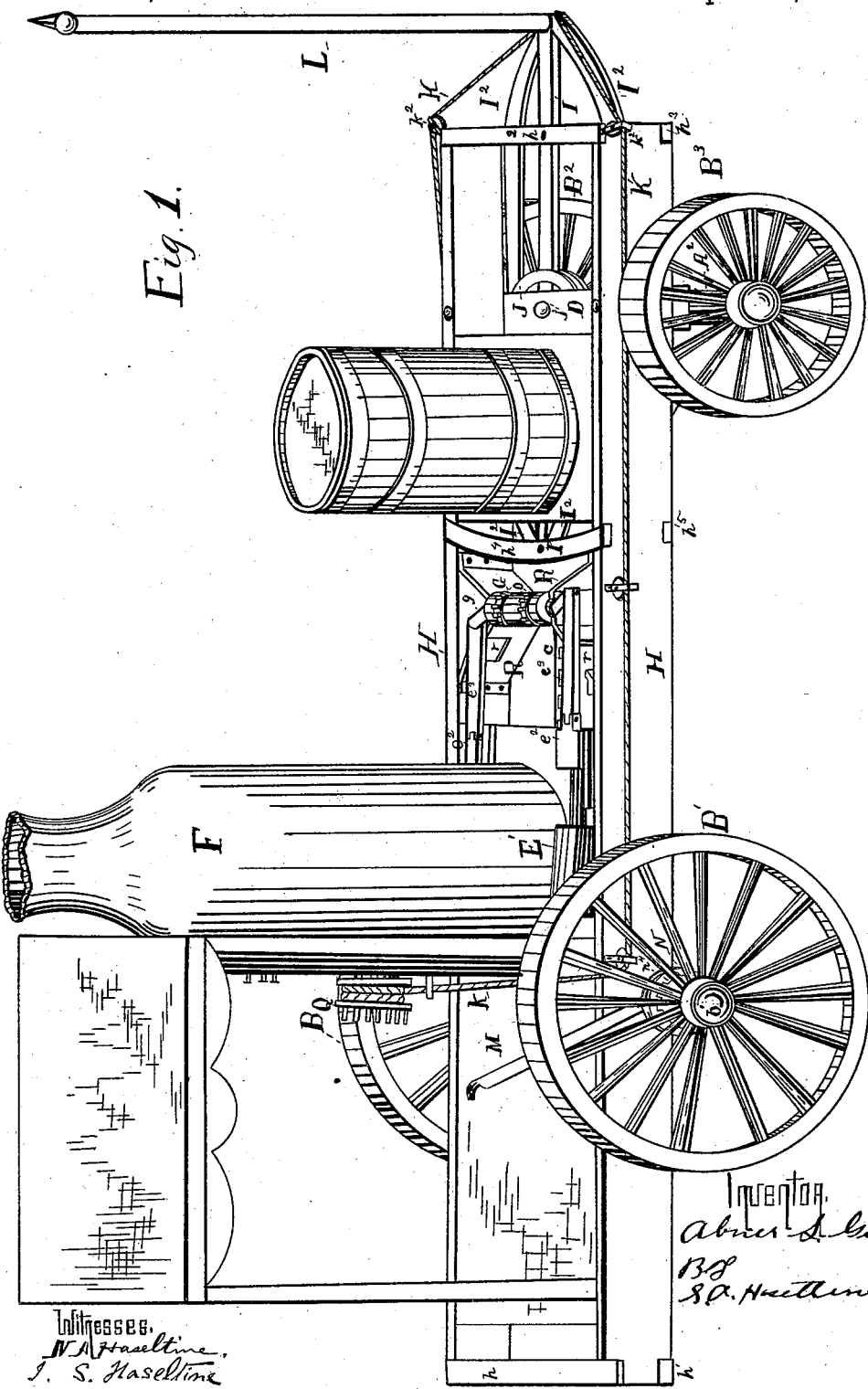

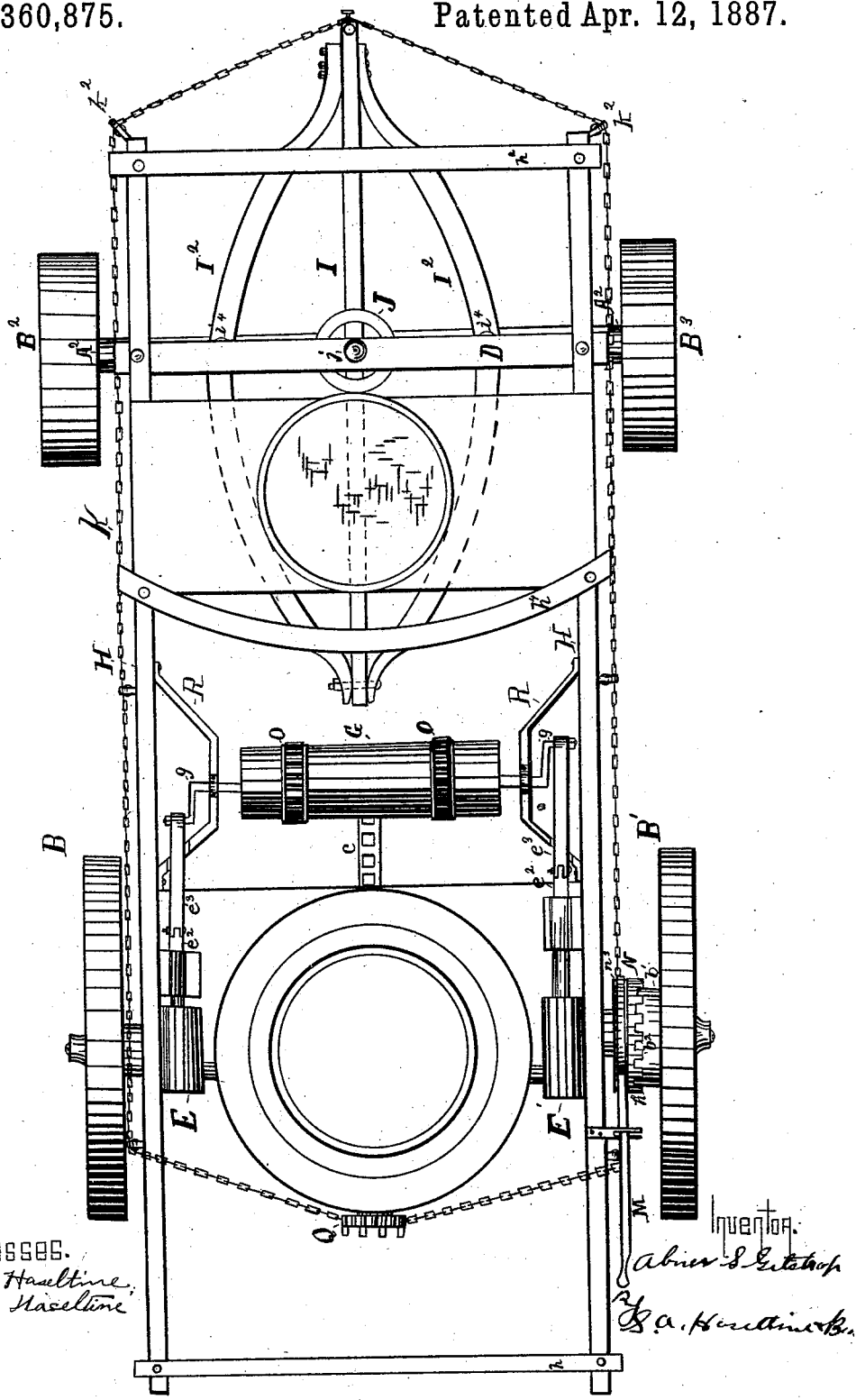

(No Model.) 3 Sheets—Sheet 3.
A. L. GILSTROP.
LOCOMOTIVE.
No. 360,875. Patented Apr. 12, 1887.
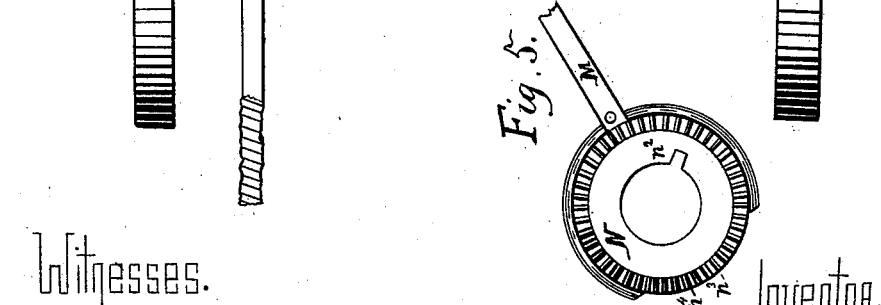

UNITED STATES PATENT OFFICE.

ABNER L. GILSTROP, OF SPRINGFIELD, MISSOURI.

LOCOMOTIVE.

SPECIFICATION forming part of Letters Patent No. 360,875, dated April 12, 1887.

Application filed September 23, 1886. Serial No. 214,312. (No model.)

*To all whom it may concern:*

Be it known that I, ABNER L. GILSTROP, a citizen of the United States, residing at Springfield, in the county of Greene and State of Missouri, have invented certain new and useful Improvements in Locomotives; and I do hereby declare the following to be a full, clear, and exact description of the invention, such as will enable others skilled in the art to which it appertains to make and use the same.

My invention relates to steam-locomotives, the object of which is to provide a cheap, simple, safe, and easily-managed locomotive for the production of traction power, which may be used on rail, common, or other roads. These objects I attain by means of the mechanism illustrated in the accompanying drawings, forming a part of this specification, in which—

Figure 1 is a view in elevation of the entire mechanism. Fig. 2 is a top view of the mechanism. Fig. 3 is a detail of the hind axle. Fig. 4 is a detail showing the crank and pulley shafts. Fig. 5 shows the clutch-pulley wheel N.

Similar letters of reference represent corresponding parts in the several figures.

A is the back axle or driving-shaft, of any desired size and shape, provided with two large drive-wheels, B B'. At its ends one of said wheels, B, is firmly secured or made stationary upon the said axle. The other drive-wheel, B', is provided with suitable bearings upon the said axle for revolving upon the same. It is also provided with a clutch-pulley, N, having a groove, $n^2$, to receive a tongue, $a^3$, upon the axle A, to cause it to revolve with the axle. It is also provided with teeth $n^4$, to engage similar teeth, $b^2$, on the inside of the hub $b'$. Said pulley is also provided with a groove, $n^3$, in its periphery, for receiving the forked end of a lever, M, said lever being pivoted to the frame or one of the stringers, H, so that as the lever is operated back and forth it throws the pulley-wheel N out and in, so as to engage the hub of the wheel B' and cause it to revolve with the axle, and when desired, as in turning the engine or mechanism, the pulley is thrown back to disengage the hub of the wheel B' by means of the lever M, so that the wheel is free to revolve upon the axle. Said axle is also provided with a long and large drum-pulley, C, over which the toggle-chain $c$ works for propelling the mechanism. Said shaft also works in suitable bearings or boxings, $h^4$, on the under side of stringers H.

$A^2$ is the front axle, provided with suitable wheels, $B^2 B^3$, for revolving at its ends. Said axle is provided with a tangent pole, I, having hounds $I^2$, secured to it by any suitable means both in front and back of the axle. Said tangent pole and hounds are firmly secured to the axle $A^2$ by means of the king-bolt $j$ and bolts $i^4$. Said axle $A^2$ is also provided with a set of circles, J, one of which is firmly secured to the axle, the other to a rocker or bolster, D.

H H are stringers of a frame, having bearings on the hind axle, A, and firmly secured to the bolster D. Said frame has cross-pieces $h\ h'\ h^2\ h^3\ h^4\ h^5$. The tangent pole and hounds work between the cross-pieces $h^2\ h^3$ and $h^4\ h^5$. On said stringers H H is a suitable platform, on which may be placed a tank for supplying water, and a box for coal; also, the base-plate of a steam-generator and a couple of engine-cylinders, E E'. Said cylinders have pistons $e^2$ attached to pitmen $e^3$, for operating winches or cranks $g$ on the ends of the crank-shaft G. Said crank-shaft is provided with toggle-chains O, forming belts for driving a lantern-shaft, P. Said lantern-shaft is also provided with the endless toggle-chain $c$, for operating the drive-shaft or hind axle, A. The relative force and velocity of the mechanism is determined by the relative sizes of the shafts G P and the drum C of the axle A.

L is a guide-rod secured to the front end of the tangent pole and hounds, and extending upward to said rod L are secured the two ends of an endless rope or chain, K. Said rope or chain extends outward over pulleys $k^2$ at the front outer corners of the frame, for the purpose of guiding the mechanism by turning the front axle. For this purpose said endless rope or chain passes around a pilot-wheel, Q, which is placed at any desired position on the frame for being operated by the engineer, preferably back of the steam-generator F and near the lever M, so that the engineer can guide the mechanism, and will be near the lever M, for freeing the wheel B' in turning short corners.

R are suitable frames, made any desired size and shape, for forming bearings for the shafts G P between the stringers H H, and leaving an opening, r, for the pitmen and cranks to operate between the frames and stringers.

I am aware that in road engines or locomotives it is not broadly new to employ a guiding-truck, in combination with means under the control of the engineer, for swiveling the said truck about a king-bolt; neither is it broadly new in a locomotive to provide the engineer with means for freeing one of the rear traction-wheels on its axle, for the purpose of turning short around. Such devices I disclaim.

Having thus described my invention, what I claim as new, and desire to secure by Letters Patent, is—

1. In a road engine or locomotive, the combination, with the main frame mounted on rear transporting-wheels and a front swivel-truck, of the clutch N b, the forked hand-lever M thereof, the endless chain connected to the front end of the tangent pole I, passed around pulleys on the main frame, and connected to a pilot-wheel, Q, the hounds I², bracing said tangent pole, and the vertical guide-rod secured to this pole, all constructed and adapted for joint operation, substantially as described.

2. In a locomotive, the combination, with the main frame mounted on traction and guiding wheels, of the two chain-drums G P, connected by endless chains and driven by engines, as described, the chain-drum C on the axle A of the main traction-wheels, the endless chain c, transmitting rotation from the drum P to said drum C, the clutch N b, fixed on said axle A, the sliding clutch N, and the forked lever M, all as shown and described.

In testimony whereof I affix my signature in presence of two witnesses.

ABNER L. GILSTROP.

Witnesses:
S. A. HASELTINE,
S. C. HASELTINE.